United States Patent
Yi et al.

(10) Patent No.: US 12,436,198 B2
(45) Date of Patent: Oct. 7, 2025

(54) BATTERY DIAGNOSIS SYSTEM AND METHOD

(71) Applicants: Hyundai Motor Company, Seoul (KR); Kia Corporation, Seoul (KR)

(72) Inventors: Jae Shin Yi, Hwaseong-si (KR); Woo Sung Kim, Hwaseong-si (KR); Kyung In Min, Hwaseong-si (KR); Do Sung Hwang, Hwaseong-si (KR); Ki Seung Baek, Hwaseong-si (KR); Dong Il Kim, Hwaseong-si (KR); Dae Gun Jin, Hwaseong-si (KR); Yoon Jun Lee, Hwaseong-si (KR); Bo Ram Yang, Hwaseong-si (KR); Ki Chul Hong, Hwaseong-si (KR); Ik Kyu Kim, Hwaseong-si (KR); Sung Il Lee, Hwaseong-si (KR); Young Woo Lee, Hwaseong-si (KR); Soo Yang Jin, Hwaseong-si (KR); Suk Hyung Kim, Hwaseong-si (KR); Hyun Soo Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 847 days.

(21) Appl. No.: 17/520,007

(22) Filed: Nov. 5, 2021

(65) Prior Publication Data
US 2022/0144131 A1    May 12, 2022

Related U.S. Application Data

(60) Provisional application No. 63/110,744, filed on Nov. 6, 2020.

(51) Int. Cl.
G01R 31/389 (2019.01)
B60L 3/00 (2019.01)
(Continued)

(52) U.S. Cl.
CPC .......... *G01R 31/389* (2019.01); *B60L 3/0046* (2013.01); *B60L 50/60* (2019.02);
(Continued)

(58) Field of Classification Search
CPC ........ B60L 3/0046; B60L 58/10; B60L 58/12; B60L 58/16; B60L 58/21; B60L 50/60;
(Continued)

(56) References Cited

U.S. PATENT DOCUMENTS 7,154,247 B2    12/2006    Kikuchi et al.
7,456,612 B2    11/2008    Murakami
(Continued)

FOREIGN PATENT DOCUMENTS

CA    2 851 503 A1    4/2013
CN    101379669 A    3/2009
(Continued)

OTHER PUBLICATIONS

Koch et al. (2014), Electrochemical Impedance Spectroscopy for Online Battery Monitoring—Power Electronics Control, 16th European Conference on Power Electronics and Applications.
(Continued)

*Primary Examiner* — John H Le
(74) *Attorney, Agent, or Firm* — Morgan, Lewis & Bockius LLP (57) ABSTRACT

The present invention relates to a battery diagnosis system and method, and disclosed is a battery diagnosis system including a receiving unit that receives information on a high voltage battery and charge state information of the high voltage battery of a vehicle being charged; a control unit that controls a current of the high voltage battery; a measurement unit that measures a voltage change amount of the high voltage battery in which the current is controlled; and a determination unit that determines the battery having the
(Continued)

voltage change amount of an abnormal battery among the voltage change amounts of the battery measured in the measurement unit.

13 Claims, 4 Drawing Sheets

(51) Int. Cl.
| | |
|---|---|
| *B60L 50/60* | (2019.01) |
| *B60L 58/10* | (2019.01) |
| *B60L 58/12* | (2019.01) |
| *B60L 58/16* | (2019.01) |
| *B60L 58/21* | (2019.01) |
| *G01R 31/367* | (2019.01) |
| *G01R 31/3835* | (2019.01) |
| *G01R 31/3842* | (2019.01) |
| *G01R 31/392* | (2019.01) |
| *G05B 23/02* | (2006.01) |
| *G07C 5/00* | (2006.01) |
| *G07C 5/08* | (2006.01) |
| *H01M 10/42* | (2006.01) |
| *H01M 10/48* | (2006.01) |

(52) U.S. Cl.
CPC ............ *B60L 58/10* (2019.02); *B60L 58/12* (2019.02); *B60L 58/16* (2019.02); *B60L 58/21* (2019.02); *G01R 31/367* (2019.01); *G01R 31/3835* (2019.01); *G01R 31/3842* (2019.01); *G01R 31/392* (2019.01); *G07C 5/008* (2013.01); *G07C 5/0825* (2013.01); *H01M 10/425* (2013.01); *H01M 10/482* (2013.01); *H01M 10/486* (2013.01); *B60L 2240/545* (2013.01); *B60L 2240/547* (2013.01); *G05B 23/0218* (2013.01); *G05B 23/0256* (2013.01); *H01M 2010/4271* (2013.01); *H01M 2220/20* (2013.01)

(58) Field of Classification Search
CPC ......... B60L 2240/545; B60L 2240/547; B60L 2240/549; B60L 2250/16; G01R 31/367; G01R 31/389; G01R 31/392; G01R 31/3842; G01R 31/3835; G07C 5/008; G07C 5/0808; G07C 5/0825; H01M 10/425; H01M 10/482; H01M 10/486; H01M 2220/20; H01M 2010/4271; G05B 23/0218; G05B 23/0256
USPC .......................................................... 702/61
See application file for complete search history.

(56) References Cited

U.S. PATENT DOCUMENTS

| | | | |
|---|---|---|---|
| 7,589,492 B2 | 9/2009 | Ooishi et al. | |
| 7,821,234 B2 * | 10/2010 | Moriya .............. | G01R 31/3842 324/426 |
| 7,893,652 B2 | 2/2011 | Suzuki et al. | |
| 7,990,109 B2 | 8/2011 | White et al. | |
| 8,000,915 B2 | 8/2011 | Furukawa et al. | |
| 8,219,333 B2 | 7/2012 | Li | |
| 8,878,493 B2 | 11/2014 | Kobayashi et al. | |
| 9,461,320 B2 | 10/2016 | Ballantine et al. | |
| 9,465,084 B2 | 10/2016 | Park et al. | |
| 9,577,458 B2 | 2/2017 | Kaita et al. | |
| 9,685,807 B2 | 6/2017 | Nakao et al. | |
| 9,720,047 B2 | 8/2017 | Joe | |
| 10,132,868 B2 | 11/2018 | Sun et al. | |
| 10,261,136 B2 | 4/2019 | Hosaka et al. | |
| 10,830,829 B2 | 11/2020 | Gelso et al. | |
| 11,316,352 B2 | 4/2022 | Hale | |
| 11,491,877 B2 | 11/2022 | Sato | |
| 11,691,518 B2 | 7/2023 | Holme | |
| 12,024,052 B2 | 7/2024 | Kim | |
| 2002/0121902 A1 | 9/2002 | Suzuki | |
| 2004/0178798 A1 | 9/2004 | Kikuchi et al. | |
| 2006/0186890 A1 | 8/2006 | Iwane et al. | |
| 2007/0052424 A1 | 3/2007 | Okumura | |
| 2008/0053715 A1 | 3/2008 | Suzuki et al. | |
| 2009/0271132 A1 | 10/2009 | Furukawa et al. | |
| 2010/0224157 A1 | 9/2010 | Mizuno | |
| 2011/0006731 A1 | 1/2011 | Wang et al. | |
| 2012/0019253 A1 | 1/2012 | Ziegler et al. | |
| 2012/0112703 A1 | 5/2012 | Xu et al. | |
| 2012/0120530 A1 | 5/2012 | Yoon | |
| 2013/0141109 A1 | 6/2013 | Love et al. | |
| 2013/0342212 A1 | 12/2013 | Kawahira et al. | |
| 2014/0159738 A1 | 6/2014 | Jeong et al. | |
| 2014/0218042 A1 | 8/2014 | Koba et al. | |
| 2014/0333315 A1 | 11/2014 | Yamamoto | |
| 2015/0228990 A1 | 8/2015 | Ballantine et al. | |
| 2015/0288197 A1 | 10/2015 | Choi | |
| 2016/0069963 A1 | 3/2016 | Hebiguchi | |
| 2017/0018823 A1 | 1/2017 | Kwon | |
| 2017/0160327 A1 | 6/2017 | Jung et al. | |
| 2017/0279164 A1 | 9/2017 | Herrema et al. | |
| 2018/0034111 A1 | 2/2018 | Hinterberger et al. | |
| 2018/0062210 A1 | 3/2018 | Kim | |
| 2018/0106869 A1 | 4/2018 | Gelso et al. | |
| 2019/0146040 A1 | 5/2019 | Murakami et al. | |
| 2019/0337403 A1 | 11/2019 | Tanaka | |
| 2020/0072909 A1 | 3/2020 | Soejima et al. | |
| 2020/0096572 A1 * | 3/2020 | You .................. | G01R 31/3828 |
| 2020/0158784 A1 | 5/2020 | Fabregas et al. | |
| 2020/0326378 A1 * | 10/2020 | Oono .................. | G01R 31/389 |
| 2020/0391610 A1 | 12/2020 | Park et al. | |
| 2020/0412153 A1 * | 12/2020 | Matsumura .......... | H02J 7/0031 |
| 2021/0231743 A1 | 7/2021 | Christopherson | |
| 2021/0323442 A1 | 10/2021 | Wu et al. | |
| 2022/0111759 A1 | 4/2022 | Ijaz | |
| 2022/0149630 A1 | 5/2022 | Burchardt | |

FOREIGN PATENT DOCUMENTS

| | | |
|---|---|---|
| CN | 103229346 A | 7/2013 |
| CN | 203909253 U | 10/2014 |
| CN | 104627007 A | 5/2015 |
| CN | 106772099 A | 5/2017 |
| CN | 109613432 A | 4/2019 |
| CN | 110165316 A | 8/2019 |
| DE | 10 2015 203 878 A1 | 9/2016 |
| DE | 10 2019 110 349 A1 | 10/2020 |
| EP | 0 438 477 B1 | 9/1995 |
| EP | 1 316 458 A1 | 6/2003 |
| EP | 1 846 776 A1 | 10/2007 |
| EP | 1 919 059 A2 | 5/2008 |
| EP | 2 403 105 A2 | 1/2012 |
| EP | 4 095 957 A1 | 11/2022 |
| FR | 3 029 299 A1 | 6/2016 |
| JP | 2002-008733 A | 1/2002 |
| JP | 2002-084666 A | 3/2002 |
| JP | 2004-328902 A | 11/2004 |
| JP | 2006-292565 A | 10/2006 |
| JP | 2007-085772 A | 4/2007 |
| JP | 2007-292666 A | 11/2007 |
| JP | 2007-333494 A | 12/2007 |
| JP | 2009-190690 A | 8/2009 |
| JP | 2010-251103 A | 11/2010 |
| JP | 4919120 B2 | 4/2012 |
| JP | 2013-083522 A | 5/2013 |
| JP | 2014-134467 A | 7/2014 |
| JP | 2018-181430 A | 11/2018 |
| JP | 6566425 B2 | 8/2019 |
| KR | 10-20080074240 A | 8/2008 |
| KR | 10-2012-0016993 A | 2/2012 |
| KR | 10-2013-0061964 A | 6/2013 |
| KR | 10-2013-0075379 A | 7/2013 |
| KR | 10-2014-0075983 A | 6/2014 |
| KR | 10-2014-0093122 A | 7/2014 |
| KR | 10-2014-0122520 A | 10/2014 |

(56) References Cited

FOREIGN PATENT DOCUMENTS

| KR | 10-2015-0052384 A | 5/2015 |
|---|---|---|
| KR | 10-1558696 B1 | 10/2015 |
| KR | 10-1755910 B1 | 7/2017 |
| KR | 10-2017-0109435 A | 9/2017 |
| KR | 10-1818515 B1 | 1/2018 |
| KR | 10-2018-0056091 A | 5/2018 |
| KR | 10-2018-0067140 A | 6/2018 |
| KR | 10-1942707 B1 | 1/2019 |
| KR | 10-1955537 B1 | 3/2019 |
| KR | 10-2017573 B1 | 9/2019 |
| KR | 10-2020-0022639 A | 3/2020 |
| KR | 10-2020-0038005 A | 4/2020 |
| KR | 10-2020-0143019 A | 12/2020 |
| KR | 10-2229019 B1 | 3/2021 |
| KR | 10-2022-0006270 A | 1/2022 |
| KR | 10-2022-0012483 A | 2/2022 |
| KR | 10-2022-0060083 A | 5/2022 |
| TW | I404644 B | 8/2013 |
| WO | 2006/082425 A1 | 8/2006 |
| WO | 2015/123304 A1 | 8/2015 |
| WO | 2016/071801 A1 | 5/2016 |
| WO | 2016/147326 A1 | 9/2016 |
| WO | 2019/008367 A1 | 1/2019 |

OTHER PUBLICATIONS

Christensen et al. (2013), Using on-board Electrochemical Impedance Spectroscopy in Battery Management Systems, EVS27 Barcelona, Spain.
Takeno et al. (2004), Quick testing of batteries in lithium-ion battery packs with impedance-measuring technology, Journal of Power Sources, 128: 67-75.
U.S.Office Action dated Jan. 3, 2023, issued in corresponding U.S. Appl. No. 17/518,986.
U.S.Final Office Action dated Jun. 26, 2023, issued in corresponding U.S. Appl. No. 17/518,986.
Office Action issued on Jul. 11, 2024 in U.S. Appl. No. 17/518,991.
Office Action issued on Jun. 17, 2024 in corresponding U.S. Appl. No. 17/520,065.
Office Action issued on Feb. 27, 2024 in U.S. Appl. No. 17/518,986.
Office Action issued Jul. 19, 2024 in U.S. Appl. No. 17/520,013.
Notice of Allowance issued on Mar. 25, 2025 in U.S. Appl. No. 17/518,991.
Notice of Allowance issued on Nov. 20, 2024 in U.S. Appl. No. 17/520,013.
Office Action issued on Aug. 6, 2025 in Chinese Patent Application No. 202111313779.9 with English translation.

* cited by examiner

FIG. 3 characteristic of polarization voltage of battery

FIG. 4

BATTERY DIAGNOSIS SYSTEM AND METHOD

CROSS-REFERENCE TO RELATED APPLICATION

This application is a non-provisional patent application of the provisional patent application No. 63/110,744 filed on Nov. 6, 2020, the disclosures of which are incorporated herein by reference in their entirety.

BACKGROUND OF THE INVENTION

Field of the Invention

The present invention relates to a battery diagnosis system, and more particularly, to a battery diagnosis system and method for detecting a potential fault cell in advance through change characteristics of a battery polarization voltage in a temporary charging stop state in a charging situation of a vehicle.

Description of the Related Art

A high voltage battery is a high-output and large-capacity battery system, which is basically an energy source that drives a motor for driving. As a high voltage battery is used over time, a battery impedance increases and a deterioration degree of battery increases. Therefore, a method for diagnosing abnormality of a high voltage battery is devised for safety.

Conventionally, an abnormality diagnosis system of a high voltage battery detects a fault of a high voltage battery by using an insulation resistance and a cell voltage deviation of a high voltage battery system in a no-load state in a monitoring phase during parking.

In such a conventional battery diagnosis system, the values and conditions set for diagnosing abnormality of a high voltage battery are not sufficient to detect a defect that may cause a fatal problem in a system, and the characteristics (current/voltage/temperature) of the battery measured in the battery diagnosis system alone do not reflect the detailed characteristics inside an actual battery.

When energy (current) is input to a battery, a voltage behavior appears accordingly. The voltage increases when a charging current is input, and the voltage decreases when a discharging current is input. A voltage drop occurs due to an internal capacitor component and a resistance, and after the current input is cut off, the voltage value gradually stabilizes and converges to a certain value. The voltage change amount after application of the current is usually referred to as a polarization voltage, and it is possible to determine whether a battery is abnormal according to a change in magnitude of this value.

The matters described as the background art above are only for improving the understanding of the background of the present invention, and should not be taken as acknowledging that they correspond to the prior art already known to those of ordinary skill in the art.

SUMMARY OF THE INVENTION

The present invention detects in advance a potential fault cell through change characteristics of a battery polarization voltage in a temporary charging stop state in a charging situation of a vehicle. By defining a voltage change amount during a reference time of a normal cell and executing a diagnosis for abnormal cell on a cell having a change amount exceeding the defined voltage change amount, it is possible to accurately detect an abnormal cell by checking it in a temporary stop state during charging and by checking it for a sufficient period of time. In addition, it is possible to prevent unexpected fault situations by recognizing fault types in advance through a telematics service, and to prevent safety accident of high voltage components and the like.

In order to achieve the above object, the present invention provides a battery diagnosis system including a receiving unit that receives information on a high voltage battery and charge state information of the high voltage battery of a vehicle being charged; a control unit that controls a current of the high voltage battery; a measurement unit that measures a voltage change amount of the high voltage battery in which the current is controlled; and a determination unit that determines the battery having the voltage change amount of an abnormal battery among the voltage change amounts of the battery measured in the measurement unit.

The information on the high voltage battery of the vehicle received in the receiving unit may include a current and voltage of the high voltage battery and temperature information of the high voltage battery, and the charge state information of the high voltage battery may include fast charging state or slow charging state.

The measurement unit may measure the voltage change amount of an individual battery cell of the high voltage battery in which the current is controlled, and the determination unit may determine the battery cell having the voltage change amount of an abnormal battery cell among the voltage change amount of the individual battery cell measured in the measurement unit as the abnormal battery cell.

The control unit may control the current of the high voltage battery to a target current value.

The control unit may control the current of the high voltage battery to the target current value by lowering a current amount consumed by an electric component.

The control unit may control the current of the high voltage battery to the target current value according to the received battery temperature and charge state, and the measurement unit may measure the voltage change amount of the high voltage battery in which the current is controlled to the target current value.

The determination unit may determine the battery having the voltage change amount of the abnormal battery through polarization voltage characteristic of the battery while the current is controlled to the target current value.

The determination unit may determine that the battery having the voltage change amount of the abnormal battery among the voltage change amounts of the battery as the abnormal battery based on a comparison of the voltage change amount of a normal battery and the voltage change amount of the abnormal battery.

A display unit that diagnoses the abnormal battery determined by the determination unit as a fault and displays a normal battery and the abnormal battery may be further included.

A calculation unit that calculates a deterioration degree of the battery may be further included, and the deterioration degree of the battery may be calculated through a resistance value of the battery in which charging is completed compared to an initial battery resistance value.

In order to achieve the above object, the present invention provides a battery diagnosis method including the steps of receiving information on a high voltage battery and charge state information of the high voltage battery of a vehicle being charged; controlling a current of the high voltage battery; measuring a voltage change amount of the high voltage battery in which the current is controlled; and determining the battery having the voltage change amount of an abnormal battery among the voltage change amounts of the battery measured in a measurement unit as the abnormal battery.

In the step of determining as the abnormal battery, the battery having the voltage change amount of the abnormal battery among the voltage change amounts of the battery may be determined as the abnormal battery based on a comparison of the voltage change amount of a normal battery and the voltage change amount of the abnormal battery.

In the step of controlling the current of the high voltage battery, the current of the high voltage battery may be controlled to a target current value.

After the step of determining the battery having the voltage change amount of the abnormal battery as the abnormal battery, the step of diagnosing the abnormal battery determined in a determination unit as a fault and displaying a normal battery and the abnormal battery may be further included.

After the step of determining the battery having the voltage change amount of the abnormal battery as the abnormal battery, the step of transmitting information on a normal battery and the abnormal battery may be further included.

According to the battery diagnosis system and method, a potential fault cell may be detected in advance through change characteristics of a battery polarization voltage in a temporary charging stop state in a charging situation of a vehicle. By defining a voltage change amount during a reference time of a normal cell and executing a diagnosis for abnormal cell on a cell having a change amount exceeding the defined voltage change amount, it is possible to accurately detect the abnormal cell by checking it in a temporary stop state during charging and by checking it for a sufficient period of time. In addition, it is possible to prevent unexpected fault situations by recognizing fault types in advance through a telematics service, and to prevent safety accident of high voltage components and the like.

The effects obtainable in the present invention are not limited to the above-mentioned effects, and other effects not mentioned will be clearly understood by those of ordinary skill in the art from the following description.

DETAILED DESCRIPTION OF THE INVENTION

Specific structural or functional descriptions for embodiments of the present invention disclosed in this specification or application are only exemplified for the purpose of describing the embodiments according to the present invention, and the embodiments according to the present invention may be implemented in various forms and should not be construed as being limited to the embodiments described in the present specification or application. Hereinafter, the embodiments of the present invention will be described in detail with reference to the accompanying drawings.

Figure 1:
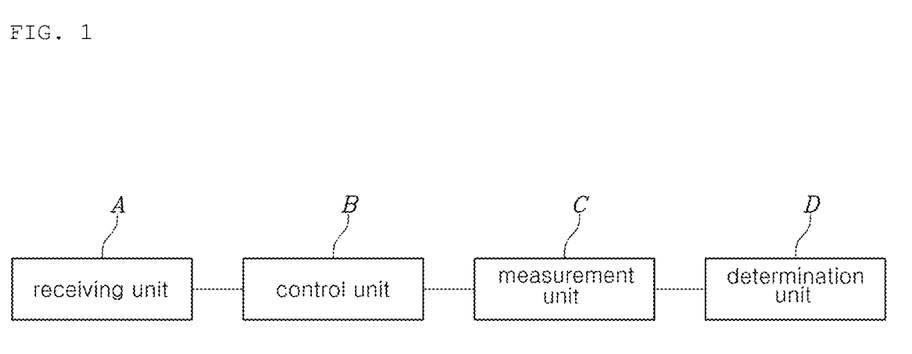
FIG. 1 is a view illustrating a battery diagnosis system according to an embodiment of the present invention.
Figure 2:
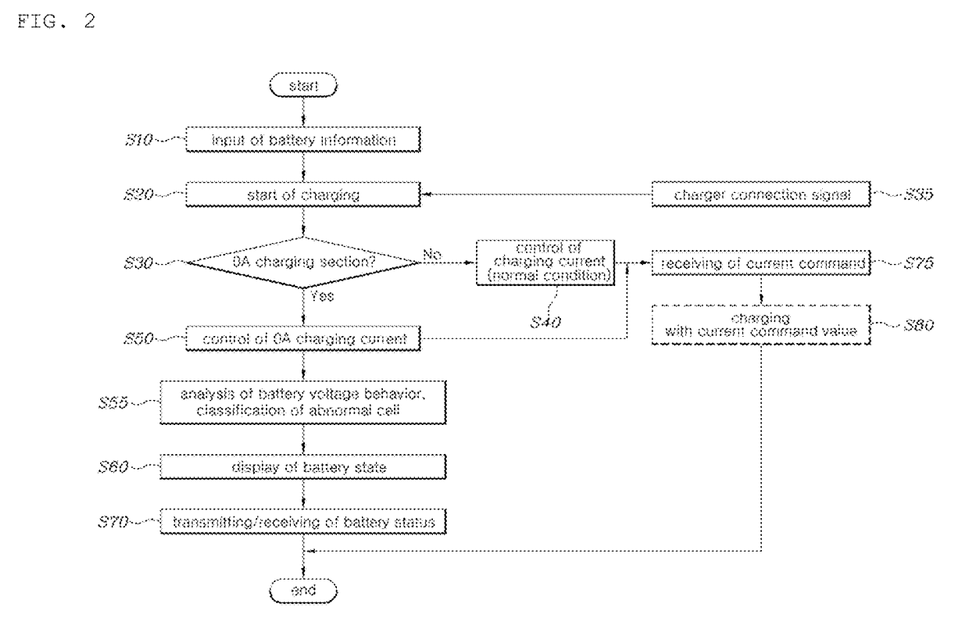
FIG. 2 is a flowchart illustrating an operation of the battery diagnosis system of FIG. 1.
Figure 3:
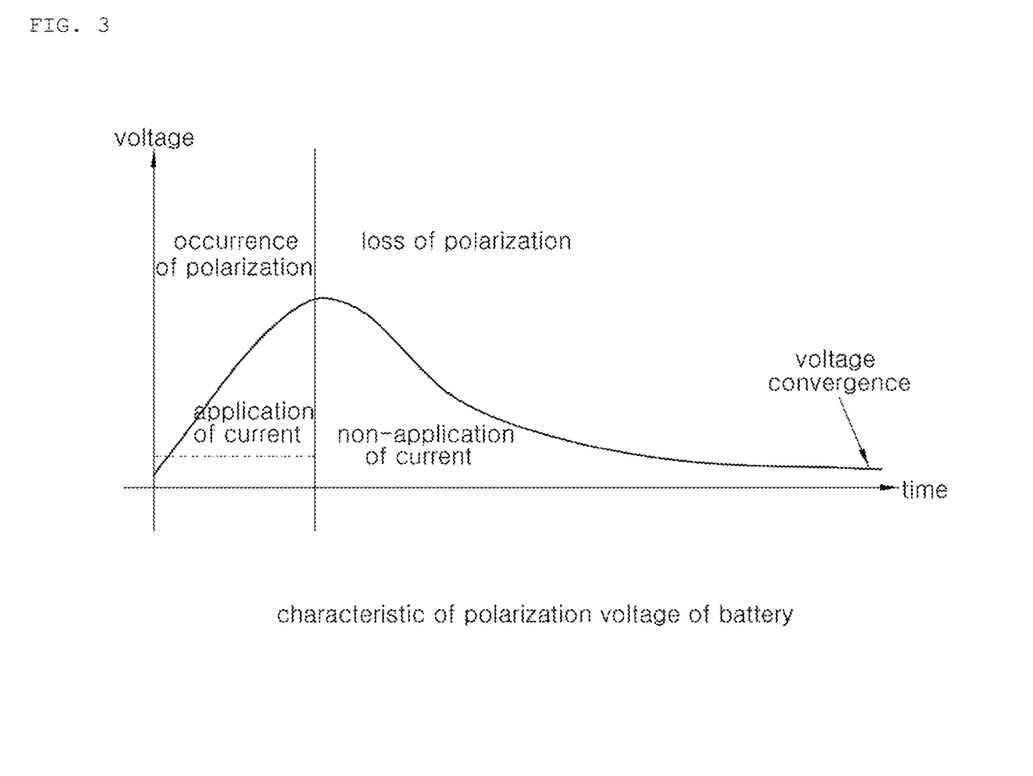
FIG. 3 is a graph illustrating characteristics of a polarization voltage of a battery.
Figure 4:
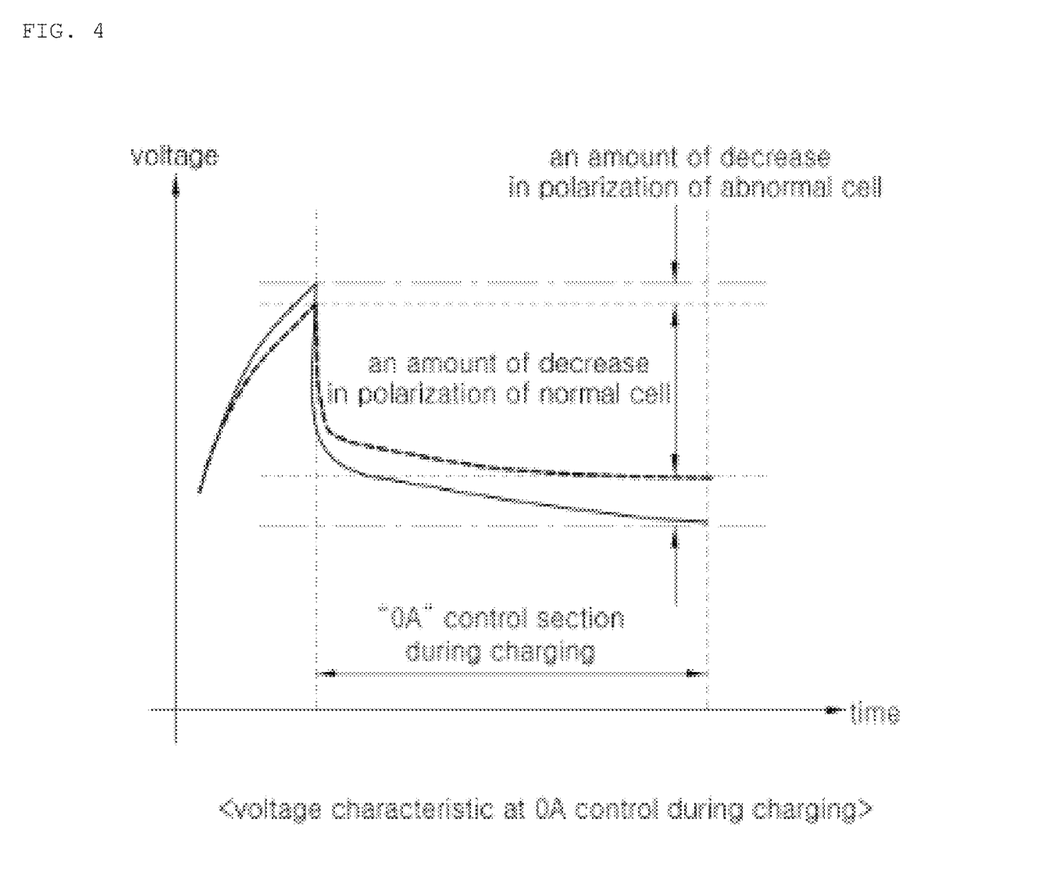
FIG. 4 is a graph illustrating a polarization change between an abnormal battery and a normal battery.

FIG. 1 is a view illustrating a battery diagnosis system according to an embodiment of the present invention. FIG. 2 is a flowchart illustrating an operation of the battery diagnosis system of FIG. 1. FIG. 3 is a graph illustrating characteristics of a polarization voltage of a battery. FIG. 4 is a graph illustrating a polarization change between an abnormal battery and a normal battery.

FIG. 1 is a view illustrating a battery diagnosis system according to an embodiment of the present invention. Referring to FIG. 1, a battery diagnosis system is configured to include a receiving unit (A) that receives information on a high voltage battery and charge state information of the high voltage battery of a vehicle being charged; a control unit (B) that controls a current of the high voltage battery; a measurement unit (C) that measures a voltage change amount of the high voltage battery in which the current is controlled; and a determination unit (D) that determines a battery having the voltage change amount of an abnormal battery among the battery voltage change amounts measured by the measurement unit (C) as an abnormal battery.

The present invention is characterized in that a battery having the voltage change amount of an abnormal battery among the measured voltage change amounts of the battery is determined as the abnormal battery. In order to determine the battery having the voltage change amount of the abnormal battery among the measured voltage change amounts of the battery as the abnormal battery, it is necessary to create a situation where whether the battery is abnormal is determined according to a magnitude change of a polarization voltage, which is a voltage change amount after application of a current.

An abnormality diagnosis system of a high voltage battery generally detects fault of the high voltage battery by using an insulation resistance and cell voltage deviation of a high voltage battery system in a no-load state. In such a diagnosis system of a high voltage battery, the values and conditions set for diagnosing the abnormality of the high voltage battery are not sufficient to detect defects that may cause a fatal problem in a system, and the characteristics (current/voltage/temperature) of the battery measured in the battery diagnosis system alone do not actually reflect the detailed characteristics inside the battery. Therefore, it is necessary to diagnose the fault of the battery in advance by determining whether the battery is defective by reflecting the detailed characteristics inside the actual battery.

However, since the battery characteristics (current/voltage/temperature) measured in the battery diagnosis system do not include the detailed characteristics inside the battery, a method of detecting the characteristics including the detailed characteristics inside the battery should be considered. A battery impedance is also referred to as a battery internal resistance, and as the battery impedance increases, the deterioration degree of the battery increases. If the deterioration degree of the battery increases, the lifespan of the battery is reduced. When the internal resistance increases, a voltage drop increases due to the internal resistance, so that even if the battery is charged with electricity, sufficient power cannot be supplied to a load. Thus, a method for diagnosing the abnormality of a high voltage battery should be devised. The high voltage battery is a high-output and large-capacity battery system, which is basically an energy source that drives a motor for driving. As the high voltage battery is used over time, the battery impedance increases and the deterioration degree of the battery increases. The abnormality diagnosis system of the high voltage battery detects a fault of the high voltage battery by using the insulation resistance and cell voltage deviation of the high voltage battery system in a no-load state in the monitoring phase during parking. In such a battery diagnosis system, the values and conditions set for diagnosing the abnormality of the high voltage battery are not sufficient to detect defects that may cause fatal problems in a system, and there is a problem in that the characteristics (current/voltage/temperature) of the battery measured in the battery diagnosis system alone cannot actually reflect the detailed characteristics inside the battery. When energy (current) is input to the battery, a voltage behavior appears accordingly. The characteristics of voltage increasing when a charging current is input and voltage decreasing when a discharging current is input are shown. The voltage drop occurs due to an internal capacitor component and a resistance, and after the current input is cut off, a voltage value gradually stabilizes and converges to a certain value. The voltage change amount after application of the current is usually referred to as a polarization voltage, and the presence or absence of abnormality in the battery can be determined according to the magnitude change of the polarization voltage.

The battery diagnosis system according to the present invention controls a temporary charging current during charging to a target current value to measure a voltage change amount of an individual battery for a predetermined time. According to a charging type of the high voltage battery of the vehicle, the voltage change amount for the predetermined time may be different in fast charging which is a high current charging and in slow charging which is a low current charging. In addition, a reference value for the voltage change amount according to each current magnitude is provided in a table, and the voltage change amount is classified in a state in which it is controlled to a target current value in a corresponding current condition, and the detection of an abnormal battery is executed. In the battery diagnosis system, controlling to the target current value of a temporary charging current during charging is to adjust the charging current in the battery to the target current value, so that dark current exit is charging, not preventing charging from occurring. Therefore, the present invention determines the battery having the voltage change amount of an abnormal battery among the voltage change amounts measured in the charging situation of the vehicle as an abnormal battery, so it is possible to detect in advance a potential fault cell through the change characteristic of a polarization voltage of a battery in a temporary charging stop state. In the present invention, the charging current does not necessarily have to be controlled to zero (0)A as the target current value, and the same result can be obtained even if the charging current is controlled to zero (0)A or a current value close to zero (0)A for diagnosis.

Specifically, the receiving unit (A) receives information on the high voltage battery and charge state information of the high voltage battery of the vehicle being charged, and the control unit (B) controls the current of the high voltage battery. The receiving unit (A) receives a battery voltage, a battery current, and battery temperature information as the battery information, and also receives charge state information of the high voltage battery charge such as fast charging state or slow charging state, so that they are used to control the current of the high voltage battery in the control unit (B).

The measurement unit (C) measures the voltage change amount of the high voltage battery in which the current is controlled, and the determination unit (D) determines the battery having the voltage change amount of the abnormal battery among the measured voltage change amounts of the battery as the abnormal battery. The measurement unit (C) measures the voltage change amount for each cell of the high voltage battery for each time period by using the information received from the receiving unit (A), and stores the measured voltage change amount for each time period of the measured cell. The determination unit (D) compares the voltage change amount information of each measured cell with the battery voltage change amount information for each time period in a normal state, checks the cell information having the voltage change amount information of an abnormal value, and identifies fault information on an abnormal cell for using in fault diagnosis. Accordingly, the present invention is to detect a potential fault cell in advance through the change characteristic of the polarization voltage of the battery in a temporary charging state in a charging situation of the vehicle.

The information on the high voltage battery of the vehicle received in the receiving unit (A) includes the current and voltage of the high voltage battery, and the temperature information of the high voltage battery, and the charge state information of the high voltage battery may include fast charging state or slow charging state.

The current and voltage information passing through the high voltage battery, and the temperature information of the high voltage battery mean battery information, and the charge state information of the high voltage battery means whether the battery charging is fast charging or slow charging. It is necessary to measure the impedance of each cell of the high voltage battery while converting it for each frequency band by using the information received from the receiving unit (A), and to store the measured impedance information of each cell.

The measurement unit (C) measures the voltage change amount of individual battery cell of the high voltage battery in which the current is controlled, and the determination unit (D) determines the battery cell having the voltage change amount of an abnormal battery cell among the voltage change amount of the individual battery cell measured at the measurement unit (c) as the abnormal battery cell.

A battery cell is a basic unit of a lithium-ion battery that can be used by charging or discharging electrical energy. In general, an electric vehicle battery is composed of a battery cell (Cell), a battery module (Module), and a battery pack (Pack), and the battery cells are installed in the electric vehicle through in the form of module and pack in order to safely and efficiently manage numerous battery cells. Several battery cells are bundled to form a module, several modules are bundled to form a pack, and the battery in a single pack is finally put in the electric vehicle. Accordingly, the measurement unit (C) measures the voltage change amount of an individual battery cell of the high voltage battery with the current controlled, and the determination unit (D) may determine the battery cell having the voltage change amount of the abnormal battery cell among the voltage change amount of the individual battery cell measured at the measurement unit (c) as the abnormal battery cell.

The control unit (B) controls the current of the high voltage battery to a target current value.

By defining a voltage change amount for a reference time of a normal cell and executing the abnormal cell diagnosis on the cell with the change amount exceeding the definition, the abnormal cell can be accurately detected by diagnosing it for a sufficient period of time in a temporary idle state during charging. Based on the current state information of the battery, a charging current value for current control during charging is transmitted to a charger as a command value, and the charger charges the battery with the received charging current. In particular, in a specific state of charge (SOC), the charging current command value capable of controlling the battery current to the target current value is transmitted to the charger.

The control unit (B) may control the current of the high voltage battery to the target current value by lowering the amount of current consumed by an electric component to a command value.

The electric component as used in the present invention means a device that uses electricity as a power source in a vehicle, such as a starting device, a charging device, and an electronic control device. In order to charge the high voltage battery, a battery management system provides the charging current command to the charger. The fast/slow charger applies a charging current to the high voltage battery with the command value received from the battery management system. Under normal conditions in the battery management system, the charging current command value is determined based on the temperature, current, voltage value of the battery and a previously calculated and stored state of charge (SOC) value, and is transmitted to the charger. In the case of charging controlled to the target current value for abnormality diagnosis of the high voltage battery, the battery is controlled to be close to zero (0)A when it is introduced into the charging section of a specific target current value (condition determination with the specific temperature SOC). Even if a charging current is provided with a target current value in an electric vehicle, the power of the high voltage battery is consumed because power is consumed by the controller and air conditioners inside the vehicle. Accordingly, in order to make the state of charge of the high voltage battery unchanged, the charger must be provided with power equal to the consumed electric power of the electric components. In the battery management system, the amount of current consumed by the electric component is lowered to a command value through the LDC in the charging section controlled by the target current value, enabling charging with the target current value.

The control unit (B) controls the current of the high voltage battery to the target current value according to the received temperature and state of charge of the battery, and the measurement unit (C) measures the voltage change amount of the high voltage battery whose current is controlled to the target current value.

FIG. 3 is a graph illustrating characteristics of a polarization voltage of a battery.

Referring to FIG. 3, the determination unit D may determine the battery having the voltage change amount of an abnormal battery as the abnormal battery through a polarization voltage characteristic of the battery in while the current is controlled to the target current value.

When energy (current) is input to the battery, a voltage behavior appears accordingly, and a voltage rises when a charging current is input and the voltage decreases when a discharging current is input. That is, an internal capacitor component and a resistance (R) causes a voltage drop, and after the current input is cut off, a voltage value gradually stabilizes and converges to a certain value. The voltage change amount after the application of current is usually referred to as a polarization voltage, and it is possible to determine whether the battery is abnormal according to the change in the polarization voltage magnitude. The voltage change amount of an individual battery is measured for a certain period of time by controlling a temporary charging current to the target current value during charging. Depending on a charging type, in the case of fast charging, which is high current charging, and slow charging, which is low current charging, the difference in voltage change amounts for a certain period of time may appear differently. By providing a table with a reference value for the voltage change amount according to the magnitude of each current, the voltage change amount is classified in the current state controlled by the target current value under the corresponding current condition, and the detection for the abnormal battery is performed.

FIG. 4 is a graph illustrating a polarization change between an abnormal battery and a normal battery.

Referring to FIG. 4, the determination unit (D) determines the battery having the voltage change amount of the abnormal battery among the voltage change amounts of the battery as the abnormal battery based on the comparison of the voltage change amount of the normal battery and the voltage change amount of the abnormal battery.

When the polarization change between the abnormal battery and the normal battery is examined, a difference as shown in FIG. 4 can be confirmed. In the case of the abnormal cell, if left unattended due to an internal short circuit, etc., it shows a continuous voltage drop characteristic, and as the abnormality degree increases, the voltage change amount that is decreased can be confirmed larger. A voltage change amount for a reference time of the normal cell is defined, and abnormal cell diagnosis is performed on the cell having the voltage change amount exceeding the definition. The information on the cell detected by diagnosis (a cell number, a voltage change amount of an abnormal cell, detection step) is stored, and transmitted so that the information can be represented. Like a battery equivalent circuit, the battery has a resistance (R) component, and this value can be analyzed as the deterioration characteristic of the battery. As the battery deteriorates, the resistance value increases, so that it can be determined that the battery is abnormal.

A display unit that diagnoses the abnormal battery determined by the determination unit (D) as a fault, and displays the normal battery and the abnormal battery may be further included.

The display unit displays fault diagnosis information based on a fault type on a cluster or an audio, video, navigation (AVN). The AVN means an infotainment system of a vehicle, and it is generally called AVN in Korea. The role of AVN is gradually expanding, and is a multimedia device handling audio, video, and navigation. In addition, the fault information is transmitted to a central computer system so that it can be provided to a user, and it can be a text or phone notification for the user.

A calculation unit that calculates a deterioration degree of the battery may be further included, and the degree deterioration of the battery is calculated based on a resistance value of the battery in which charging is completed compared to an initial battery resistance value.

In the calculation unit, the resistance value (resistance=voltage/current) may be calculated based on the input current by measuring a voltage decrease within 1 second after charging is completed. The ratio ($R_n/R_0$) is calculated with the resistance value of an initial cell obtained as $R_0$, and the resistance value ($R_n$) calculated from the voltage drop rate after charging is completed, so that the deterioration degree is easily measured. Here, the resistance value varies according to temperature/SOC, so the initial cell resistance value is stored in a table as a value according to temperature/SOC. The deterioration degree may be calculated using Rn calculated after extracting the initial resistance in each condition from the provided resistance table. Accordingly, in the calculation unit, the deterioration degree of battery is calculated through the resistance value of the fully charged battery compared to the initial battery resistance value.

FIG. 2 is a flowchart illustrating an operation of the battery diagnosis system of FIG. 1.

Referring to FIG. 2, a battery diagnosis method including the steps of receiving information on a high voltage battery and charge state information of the high voltage battery of a vehicle being charged (S10); controlling a current of the high voltage battery (S50); measuring a voltage change amount of the high-voltage battery in which the current is controlled (S55); and determining a battery having the voltage change amount of an abnormal battery among the voltage change amounts of the battery measured by the measurement unit (C) as the abnormal battery (S60).

Detailed technical characteristics in each step of the battery diagnosis method according to the present invention are the same as or similar to the technical characteristics of each configuration in the battery diagnosis system according to the present invention described above, and thus detailed description thereof will be omitted.

After the step of receiving the information on the high voltage battery and the charge state information of the high voltage battery of the vehicle being charged (S10), the step of starting charging of the battery (S20) when a charger is connected to the battery and a charger connection signal is received (S35) may be further included.

Before the step of controlling the current of the high voltage battery (S50), the step of determining whether the charging current is controlled to a target current value (S30) may be further included.

When an electric component consumes power in the step of determining whether the charging current is controlled to the target current value (S30), the steps of controlling the charging current under a normal condition (S40) and receiving a received current command (S75) may be further included.

After the steps of controlling the charging current under the normal condition (S40) and receiving the received current command (S75), the step of charging the battery through a received current command value (S80) may be further included.

In the step of determining as the abnormal battery (S60), based on the comparison of the voltage change amount of the normal battery and the voltage change amount of the abnormal battery, the battery having the voltage change amount of the abnormal battery among the voltage change amounts of the battery is determined as the abnormal battery.

The step of controlling the current of the high voltage battery (S50) may be characterized in that the current of the high voltage battery is controlled to the target current value.

After the step of determining the battery having the voltage change amount of the abnormal battery as the abnormal battery (S50), the step of diagnosing the abnormal battery determined by the determination unit (D) as a fault, and displaying the normal battery and the abnormal battery may be further included.

After the step of determining the battery having the voltage change amount of the abnormal battery as the abnormal battery (S50), the step of transmitting information on the normal battery and the abnormal battery (S70) may be further included.

Although specific embodiments of the present invention have been illustrated and described above, it will be apparent to those skilled in the art that the present invention can be variously improved and changed within the scope of the claims.

DESCRIPTION OF REFERENCE NUMERALS

A: receiving unit
B: control unit
C: measurement unit
D: determination unit

What is claimed is:

1. A battery diagnosis system, comprising:
a receiving unit that receives charge state information of a high voltage battery of a vehicle being charged including charging types of the high voltage battery;
a control unit that controls a current of the high voltage battery;
a measurement unit that measures a voltage change amount of the high voltage battery in which the current is controlled; and
a determination unit that determines the battery having the voltage change amount of an abnormal battery among the voltage change amounts of the battery measured in the measurement unit,
wherein the determination unit determines the battery having the voltage change amount of an abnormal battery in different ways depending on the charging types according to the charging state information,
wherein the control unit controls the current of the high voltage battery to a target current value based on the charging types of the high voltage battery included in the received charge state information, and
wherein the measurement unit measures the voltage change amount of the high voltage battery in which the current is controlled to the target current value.

2. The battery diagnosis system according to claim 1,
wherein the receiving unit receives information on the high voltage battery, and
wherein the information on the high voltage battery of the vehicle received in the receiving unit includes a current and voltage of the high voltage battery and temperature information of the high voltage battery, and wherein the charging type includes fast charging state or slow charging state.

3. The battery diagnosis system according to claim 2,
wherein the control unit controls the current of the high voltage battery to the target current value further considering the received battery temperature.

4. The battery diagnosis system according to claim 1,
wherein the measurement unit measures the voltage change amount of an individual battery cell of the high voltage battery in which the current is controlled, and the determination unit determines the battery cell having the voltage amount of an abnormal battery cell among the voltage change amount of the individual battery cell measured in the measurement unit as the abnormal battery cell.

5. The battery diagnosis system according to claim 1,
wherein the control unit controls the current of the high voltage battery to the target current value by lowering a current amount consumed by an electric component.

6. The battery diagnosis system according to claim 1,
wherein the determination unit determines the battery having the voltage change amount of the abnormal battery through polarization voltage characteristic of the battery while the current is controlled to the target current value.

7. The battery diagnosis system according to claim 1,
wherein the determination unit determines that the battery having the voltage change amount of the abnormal battery among the voltage change amounts of the battery as the abnormal battery based on a comparison of the voltage change amount of a normal battery and the voltage change amount of the abnormal battery.

8. The battery diagnosis system according to claim 1,
further comprising a display unit that diagnoses the abnormal battery determined by the determination unit as a fault and displays a normal battery and the abnormal battery.

9. The battery diagnosis system according to claim 1,
further comprising a calculation unit that calculates a deterioration degree of the battery, and
wherein the deterioration degree of the battery is calculated through a resistance value of the battery in which charging is completed compared to an initial battery resistance value.

10. A battery diagnosis method, comprising the steps of:
receiving charge state information of the high voltage battery of a vehicle being charged including charging types of the high voltage battery;
controlling a current of the high voltage battery;
measuring a voltage change amount of the high voltage battery in which the current is controlled; and
determining the battery having the voltage change amount of an abnormal battery among the voltage change amounts of the battery measured in a measurement unit as the abnormal battery,
wherein in the step of determining the battery having the voltage change amount of an abnormal battery, the battery having the voltage change amount of an abnormal battery is determined in different ways depending on the charging types according to the charging state information,
wherein a control unit controls the current of the high voltage battery to a target current value based on the charging types of the high voltage battery included in the received charge state information, and
wherein the measurement unit measures the voltage change amount of the high voltage battery in which the current is controlled to the target current value.

11. The battery diagnosis method according to claim 10,
wherein in the step of determining as the abnormal battery, the battery having the voltage change amount of the abnormal battery among the voltage change amounts of the battery is determined as the abnormal battery based on a comparison of the voltage change amount of a normal battery and the voltage change amount of the abnormal battery.

12. The battery diagnosis method according to claim 10,
further comprising, after the step of determining the battery having the voltage change amount of the abnormal battery as the abnormal battery, the step of diagnosing the abnormal battery determined in a determination unit as a fault and displaying a normal battery and the abnormal battery.

13. The battery diagnosis method according to claim 10,
further comprising, after the step of determining the battery having the voltage change amount of the abnormal battery as the abnormal battery, the step of transmitting information on a normal battery and the abnormal battery.

* * * * *